(12) United States Patent
Park et al.

(10) Patent No.: US 7,656,973 B2
(45) Date of Patent: Feb. 2, 2010

(54) APPARATUS AND METHOD FOR RECEIVING BROADCASTING SERVICE IN A BROADCASTING SYSTEM

(75) Inventors: Sung-Jin Park, Seoul (KR); Hee-Jin Roh, Suwon-si (KR); Min-Goo Kim, Yongin-si (KR); Hyun-Seok Oh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 649 days.

(21) Appl. No.: 11/488,645

(22) Filed: Jul. 19, 2006

(65) Prior Publication Data

US 2007/0019761 A1    Jan. 25, 2007

(30) Foreign Application Priority Data

Jul. 19, 2005    (KR) .................. 10-2005-0065528

(51) Int. Cl.
*H04L 27/06* (2006.01)
(52) U.S. Cl. .................. 375/341; 375/262; 714/786
(58) Field of Classification Search .................. 375/341, 375/262; 714/786
See application file for complete search history.

(56) References Cited

U.S. PATENT DOCUMENTS

| | | | | |
|---|---|---|---|---|
| 5,966,412 A | * | 10/1999 | Ramaswamy | 375/341 |
| 6,115,435 A | * | 9/2000 | Harada et al. | 375/341 |
| 6,748,566 B1 | * | 6/2004 | Laroia et al. | 714/751 |
| 7,277,498 B2 | * | 10/2007 | Hanaoka et al. | 375/316 |
| 7,492,701 B2 | * | 2/2009 | Song et al. | 370/208 |
| 2002/0037056 A1 | * | 3/2002 | Choi et al. | 375/301 |
| 2005/0254598 A1 | * | 11/2005 | Zhidkov et al. | 375/316 |

* cited by examiner

*Primary Examiner*—Juan A Torres
(74) *Attorney, Agent, or Firm*—Roylance, Abrams, Berdo & Goodman, LLP (57) ABSTRACT

A broadcasting receiving apparatus and method in a broadcasting system are provided. In a broadcasting receiver, a demodulator demodulates a received broadcasting signal, clips a soft metric value for the demodulated signal to a number of bits, and outputs the clipped soft metric value. A mapper maps the clipped soft metric value to an index value with a resolution inversely proportional to the quantization level of the soft metric value. A deinterleaver deinterleaves the index value and a demapper demaps the deinterleaved index value to a representative value being a soft metric value from a range of soft metric values mapped to the index value. A channel decoder decodes the representative value.

17 Claims, 9 Drawing Sheets

APPARATUS AND METHOD FOR RECEIVING BROADCASTING SERVICE IN A BROADCASTING SYSTEM

CROSS-REFERENCE TO RELATED APPLICATIONS

This application claims priority under 35 U.S.C. § 119(a) of Korean Patent Application No. 2005-65528, filed in the Korean Intellectual Property Office on Jul. 19, 2005, the entire disclosure of which is hereby incorporated by reference.

BACKGROUND OF THE INVENTION

1. Field of the Invention

The present invention relates generally to an apparatus and method for receiving a broadcasting service in a broadcasting system. More particularly, the present invention relates to a broadcasting service receiving apparatus and method for reducing the number of bits of received broadcasting data in a mobile communication system that provides broadcasting service.

2. Description of the Related Art

Mobile communication systems were developed to provide voice service, ensuring mobility for users. With the rapid development of technology and users' demands, mobile communication systems now provide a variety of services. These services include Short Message Service (SMS), e-mail, Internet service, and broadcasting service. The broadcasting service provides digital broadcasting to users by using high data rates which are now available due to drastic technological development. The digital broadcasting takes various forms of services depending on the media. Digital broadcasting services include Digital Multimedia Broadcasting (DMB), Code Division Multiple Access (CDMA)-based BroadCast/Multi-Cast System (BCMCS), and Multimedia Broadcast Multicast Service (MBMS) based on Universal Mobile Telecommunication System (UMTS).

Figure 1:
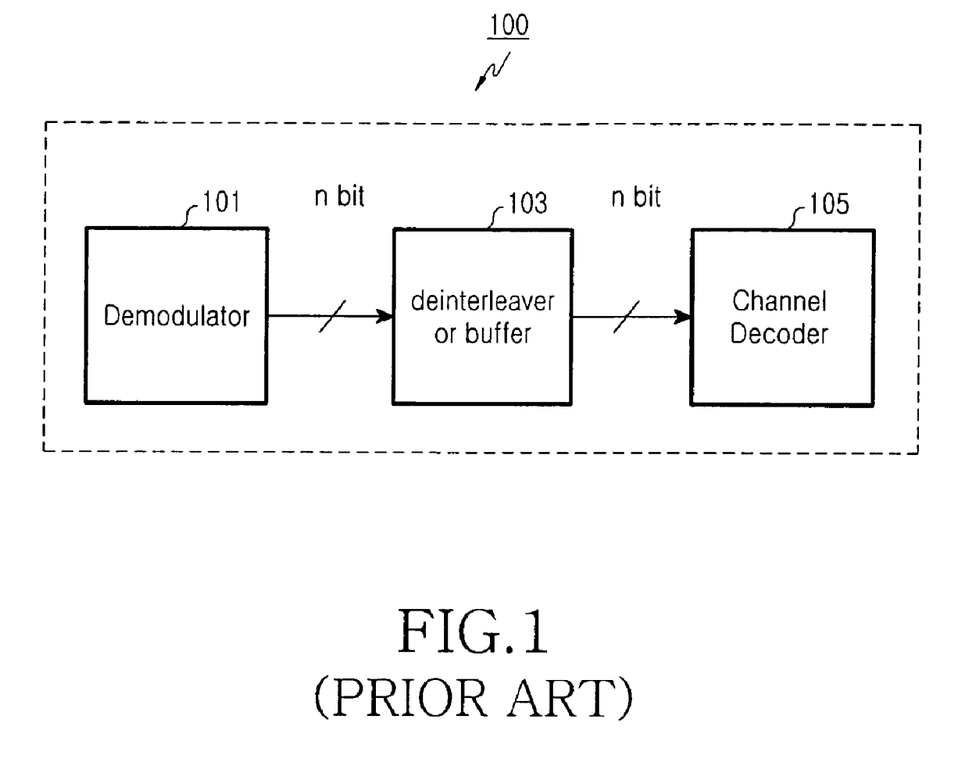
FIG. 1 is a partial block diagram of a typical broadcasting receiver.

A description will be made below of a broadcasting service receiving method in a broadcasting receiver illustrated in FIG. 1. FIG. 1 is a partial block diagram of a typical broadcasting receiver 100.

Referring to FIG. 1, in the broadcasting receiver, a demodulator 101 demodulates a modulated signal received from a broadcasting station and generates soft metric data for the demodulated signal. A deinterleaver (or buffer) 103 deinterleaves the soft metric data. A channel decoder 105 decodes the deinterleaved data in a predetermined method.

In the process, n bits output from the demodulator 101 are provided to the deinterleaver 103 without any processing. The size of the deinterleaver 103 is depth×n. The data depth is defined as a data length stored in the deinterleaver.

Since the broadcasting receiver receives multimedia data compressed by source coding in the broadcasting system, it requires a large-capacity memory buffer. To be more specific, the broadcasting receiver uses a deinterleaver of a mega-bit size for deinterleaving a received signal and a mega-bit×n memory for storing soft metrics. As a result, receiver complexity increases which in turn increases power consumption.

The increasing interest in digital broadcasting is a driving force behind development of many digital broadcasting receivers. To receive better-quality images, algorithms for increasing the performance of a digital broadcasting receiver are under development. Portability is also a requirement for the digital broadcasting receiver because mobility is critical to broadcasting service in a mobile environment. Therefore, decreasing the complexity and power consumption of a digital broadcasting receiver is a challenging issue.

Accordingly, there is a need for an improved apparatus and method for receiving a broadcasting service in a broadcasting system.

SUMMARY OF THE INVENTION

An object of the present invention is to address at least the above problems and/or disadvantages and to provide at least the advantages below. Accordingly, exemplary embodiments of the present invention provide a receiving apparatus and method for reducing complexity in a broadcasting system.

Exemplary embodiments of the present invention also provide a receiving apparatus and method for reducing power consumption in a broadcasting system.

According to one exemplary aspect of the present invention, in a broadcasting receiver of a broadcasting system, a demodulator demodulates a received broadcasting signal, clips a soft metric value for the demodulated signal to a number of bits, and outputs the clipped soft metric value. A mapper maps the clipped soft metric value to an index value with a resolution inversely proportional to the quantization level of the soft metric value. A deinterleaver deinterleaves the index value and a demapper demaps the deinterleaved index value to a representative value being a second soft metric value determined from a range of soft metric values mapped to the index value. A channel decoder decodes the representative value.

According to another exemplary aspect of the present invention, in a broadcasting receiving method of a broadcasting system, a received broadcasting signal is demodulated and a soft metric value for the demodulated signal is clipped to a number of bits. The clipped soft metric value is mapped to an index value with a resolution inversely proportional to the quantization level of the soft metric value. The index value is deinterleaved and demapped to a representative value being a second soft metric value determined from a range of soft metric values mapped to the index value. The representative value is decoded.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In order to reduce the complexity of received signal bits, exemplary embodiments of the present invention are implemented by use of a mapper for mapping demodulated data to lower bit values and a demapper for demapping the mapped bit values to the original data in addition to the configuration of a conventional broadcasting receiver.

A broadcasting receiver according to an exemplary embodiment of the present invention will be described with reference to FIG. 2.

Figure 2:
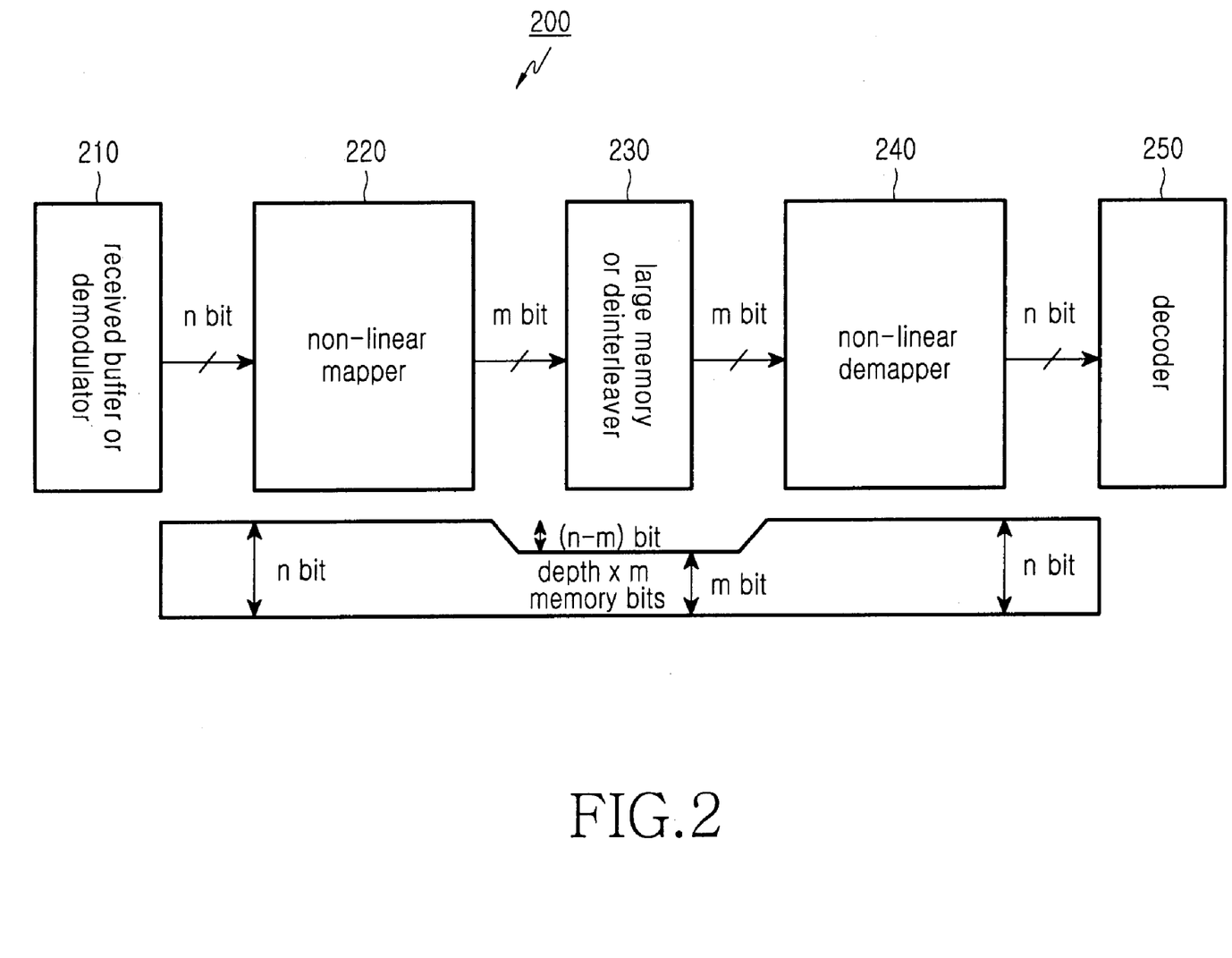
FIG. 2 is a block diagram of a broadcasting receiver according to an exemplary embodiment of the present invention.

FIG. 2 is a block diagram of a broadcasting receiver according to an exemplary embodiment of the present invention. Referring to FIG. 2, a broadcasting receiver 200 includes a demodulator 210, a non-linear mapper 220, a deinterleaver (or memory) 230, a non-linear demapper 240, and a decoder 250. The other components of the exemplary broadcasting receiver 200 will not be further addressed herein.

In operation, the demodulator 210 demodulates a signal received from a transmitter (not shown) and the decoder 250 decodes input data using a decoding method. The decoder 250 is a channel decoder for receiving soft metric values as its input, such as a Viterbi decoder. The non-linear mapper 220 characteristic of the present invention maps an n-bit signal received from the demodulator (or reception buffer) 210 to an m-bit index. The variable n is the number of bits, within a bit range that does not affect the performance of the decoder 250, and m is less than n.

An index value (for example, m) is different from a soft metric value (for example, n) in nature. It reflects the characteristics of an n-bit value. Thus a map table must be made up such that no performance degradation arises from channel decoding.

The non-linear demapper 240 demaps m-bit information received from the deinterleaver 230 to an n-bit representative value. The representative value is different from the n-bit soft metric value in nature. One of soft metric values mapped to an index value in the map table, which does not affect performance, is selected as a representative value for the index value for demapping. The representative value is empirically determined, which will be described later in detail. Consequently, the deinterleaver 230 saves (n−m)×depth of memory space.

Figure 3:
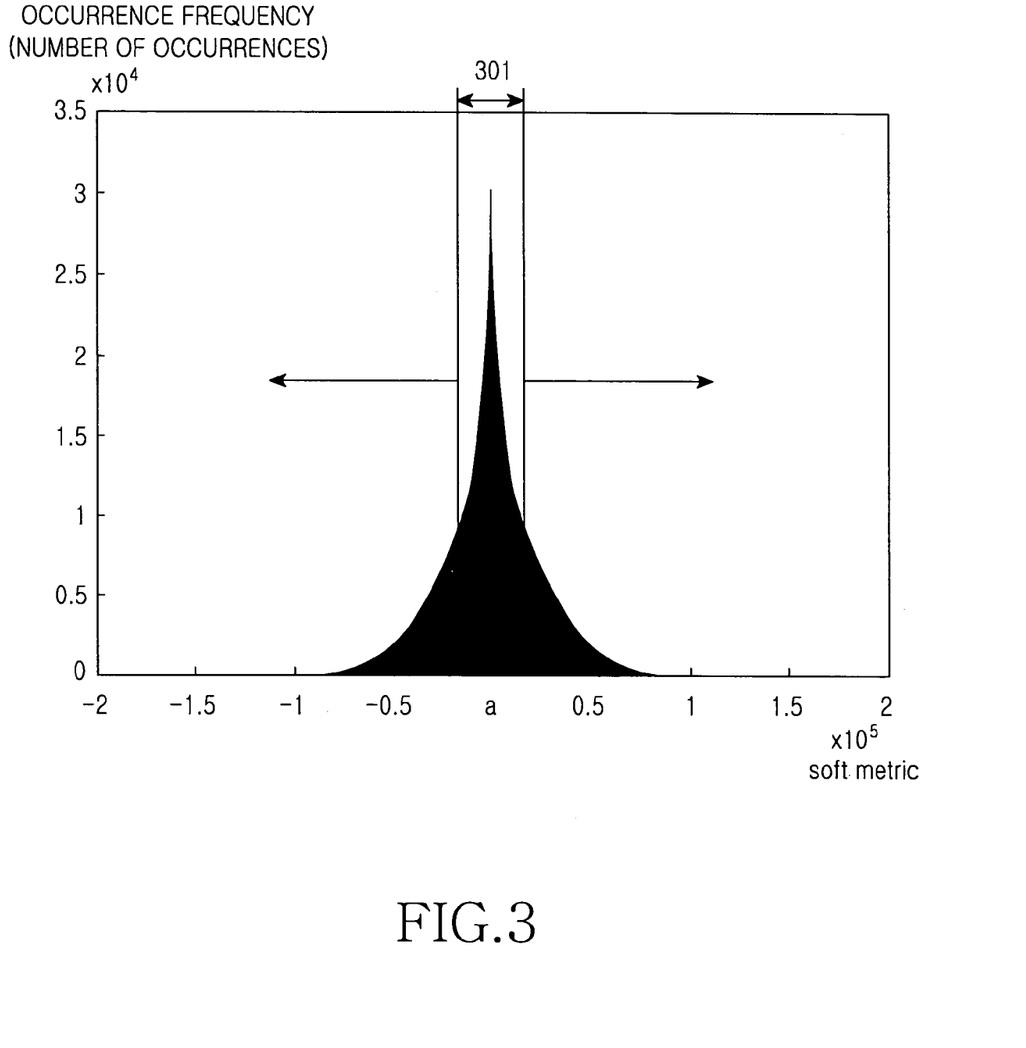
FIG. 3 is a graph illustrating the Probability Density Function (PDF) of Viterbi decoder input.

FIG. 3 is a graph illustrating the PDF of channel decoder input in an exemplary broadcasting receiver. The exemplary channel decoder may be a Viterbi decoder herein. The horizontal axis denotes a quantization level distribution of soft metric values, and the vertical axis denotes occurrence frequency.

Referring to FIG. 3, the occurrence frequency decreases as a soft metric value is farther from the origin a. In other words, as the soft metric value is closer to the origin a, the occurrence frequency increases and thus soft metric values closer to the origin are vulnerable to errors. Reference numeral 301 denotes n bits which do not affect the performance of the Viterbi decoder. The broadcasting receiver uses only the n-bit range 301 through clipping. That is, the resolution of a magnitude expressible as a particular bit width within the n-bit range determines an error range. Since the error range decreases as the resolution increases, soft metric values can be expressed more accurately.

Therefore, in order to express an n-bit received signal in decreased m bits without performance degradation in the deinterleaver, a high resolution is given to soft metric values centered around '0' and a low resolution is applied to soft metric values farther from '0'. Thus, the afore-mentioned map table must be made up to reflect this characteristic. An example of the map table according to the present invention is given as follows.

TABLE 1

| | | |
|---|---|---|
| 15 | 3 | 11 |
| 14 | | |
| 13 | | |
| 12 | | |
| 11 | | |
| 10 | 2 | 5 |
| 9 | | |
| 8 | | |
| 7 | | |
| 6 | | |
| 5 | | |
| 4 | 1 | 2 |
| 3 | | |
| 2 | | |
| 1 | 0 | 0 |
| 0 | | |
| −1 | −1 | −1 |
| −2 | | |
| −3 | −2 | −3 |
| −4 | | |
| −5 | | |
| −6 | −3 | −6 |
| −7 | | |
| −8 | | |
| −9 | | |
| −10 | | |
| −11 | | |
| −12 | −4 | −12 |
| −13 | | |
| −14 | | |
| −15 | | |
| −16 | | |

In Table 1, actual input soft metric values ranging from −16 to 15 are listed in the leftmost column index values from −4 to 3 are listed in the middle column, and representative values are in the rightmost column. The representative values have the same number of quantization levels as the index values. Thus, n is 5 and m is 3. Referring to the map table, a 5-bit soft metric value is mapped to a 3-bit index value without degrading decoder performance. To be more specific, more quantization levels farther from level '0' are mapped to one index value. For example, five or six quantization levels are mapped to one index value as far as this mapping does not affect system performance, whereas level '0' and level '1' are mapped to one index value. As noted from Table 1, an index value has a wide range of quantization levels as it is farther from level '0'.

The index values are mapped to the representative values by the demapper. The representative values offer the same performance as the original soft metric values within their index value ranges during channel decoding. As illustrated in Table 1, the lowest of soft metric values mapped to an index value is selected as a representative value for the index value. While the number of the representative values is equal to that of the index values, the representative values are expressed in the same number of bits as that of the soft metric values.

Now a description will be made of how data is processed in the broadcasting receiver according to exemplary embodiments of the present invention. Two exemplary embodiments of data processing illustrated in FIGS. 4A and 4B can be implemented depending on mapping in the map table. The mapping will be described in the context of Table 1, by way of example.

Figure 4A:
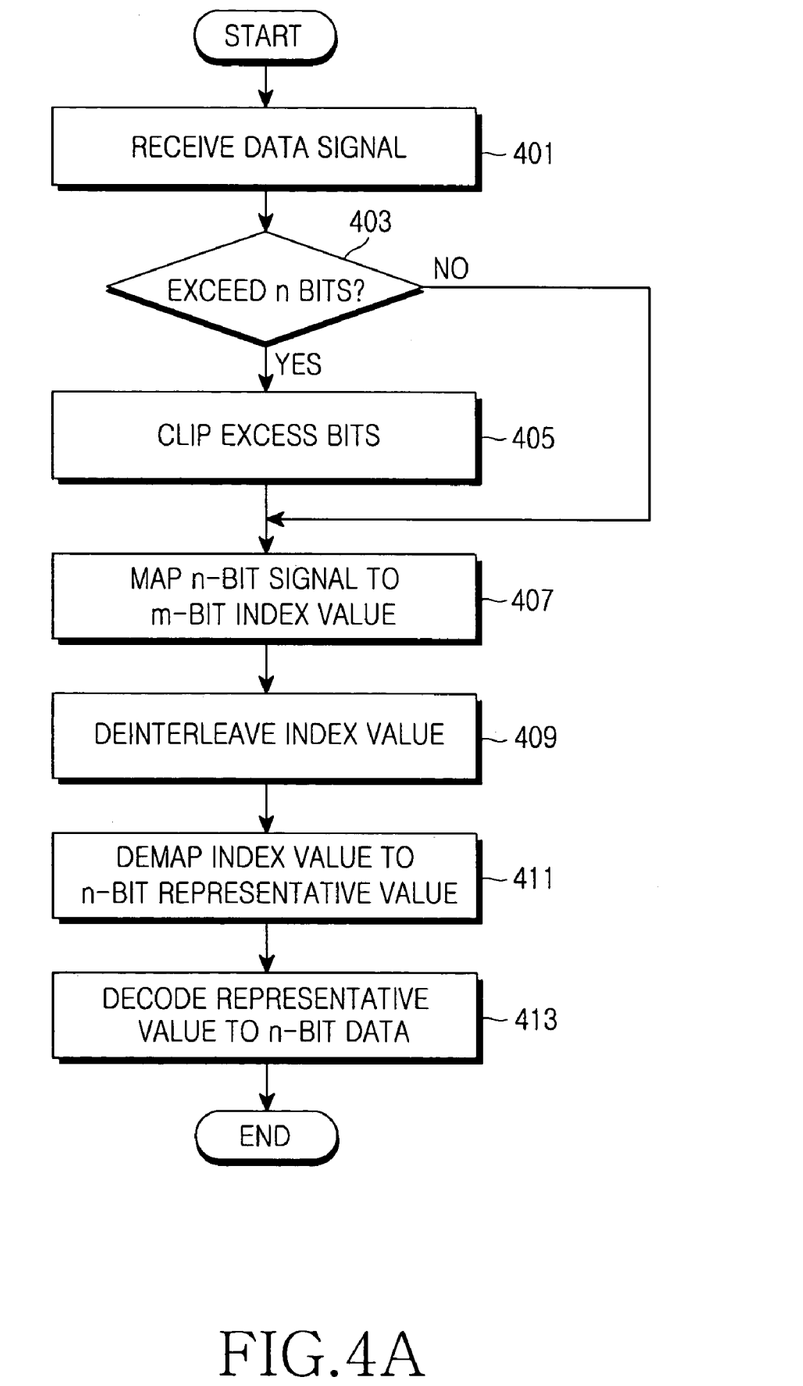
FIG. 4A is a flowchart illustrating a data processing method according to an exemplary embodiment of the present invention.

FIG. 4A is a flowchart illustrating a data processing method according to an exemplary embodiment of the present invention. The map table used in the exemplary embodiment of the present invention has n-bit soft metric values mapped to m-bit index values.

Referring to FIG. 4A, the demodulator 210 receives a data signal transmitted from an external transmitter in step 401 and compares the number of bits of a soft metric value for the data signal with n which affects receiver performance in step 403. If the bit number of the soft metric exceeds n, the excess bits are clipped in step 405. On the other hand, if the bit number of the soft metric value is equal to or less than n, the broadcasting receiver jumps from step 403 to step 407. In step 407, the n-bit soft metric value is mapped to an m-bit index value according to the address of the soft metric value in the memory of the mapper. Since the memory has the addresses of all soft metric values, its capacity is so large as to store a 2n×m-bit map table.

The deinterleaver deinterleaves the m-bit index value in step 409 and the demapper demaps the deinterleaved m-bit index value to a representative value according to the address of the m-bit index value referring to a map table stored in a memory in step 411. Since representative values are expressed in the same number of bits as index values, the memory has a 2m×m bit size. In step 413, the decoder 250 decodes the representative value to n-bit data.

Another exemplary embodiment of data processing will be described with reference to FIG. 4B. Steps 401 to 405 illustrated in FIG. 4A are performed in the same manner and thus their description is not provided herein.

Figure 4B:
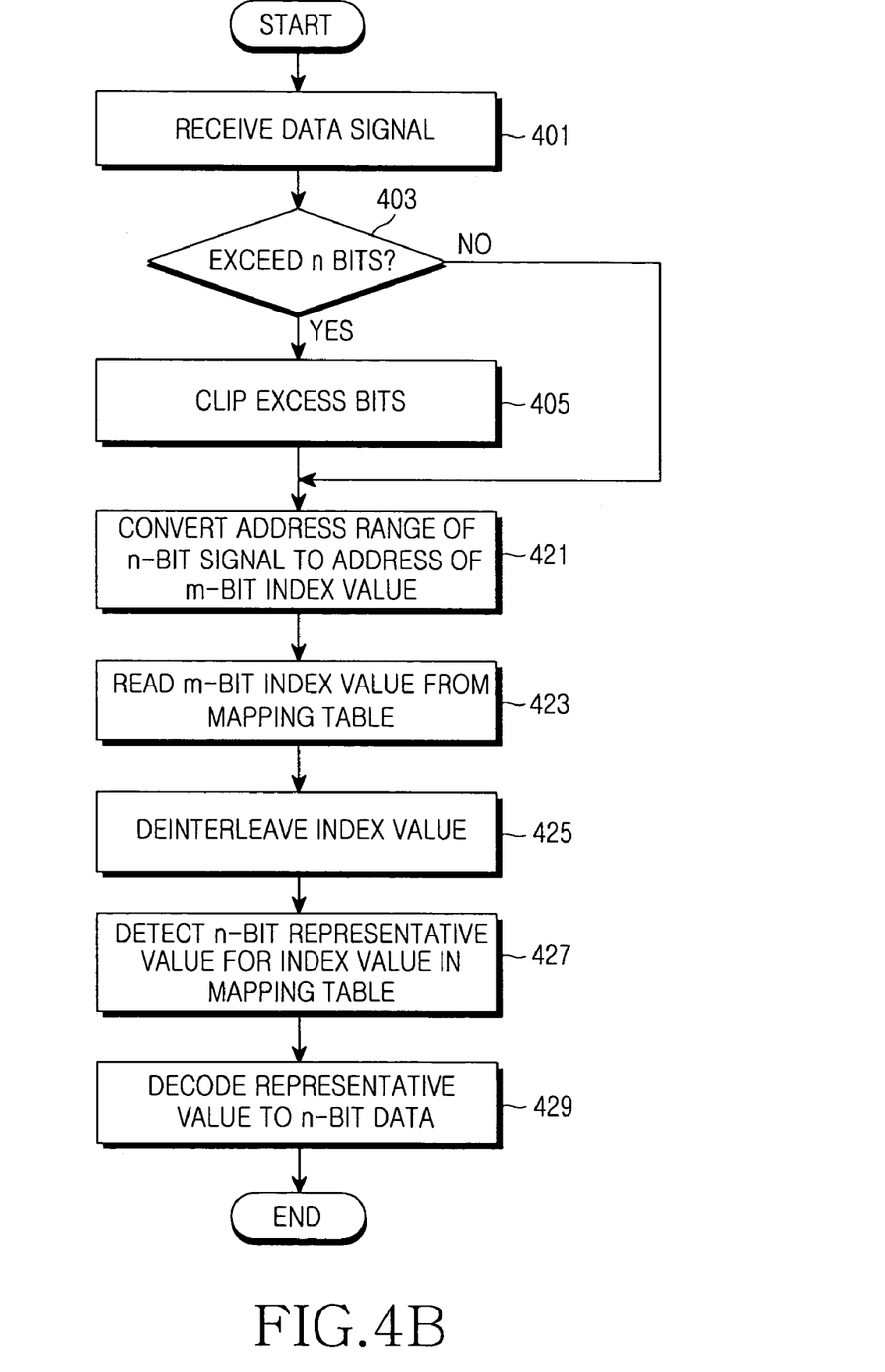
FIG. 4B is a flowchart illustrating a data processing method according to another exemplary embodiment of the present invention.

Referring to FIG. 4B, a comparator receives data clipped to n bits in step 405 and converts an address range within which the n-bit signal falls to an m-bit index value address in step 421. The mapper reads an index value at the converted address in step 423. For example, if an input soft metric value falls within the range of levels 11 to 15, its address is converted so that the soft metric value is mapped to an index value 3.

The deinterleaver deinterleaves the m-bit index value in step 425 and the demapper demaps the deinterleaved m-bit index value to an n-bit representative value in step 427. The decoder decodes the n-bit representative value to n-bit data in step 429.

The mapper and the demapper will be described in more detail with reference to FIGS. 5A, 5B and 6.

Figure 5A:
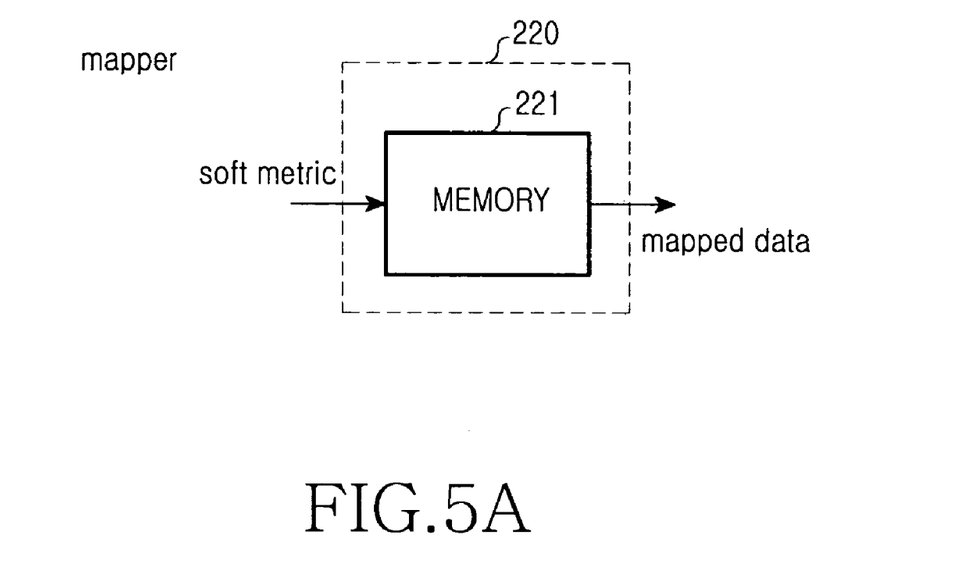
FIG. 5A is a block diagram of a mapper according to an exemplary embodiment of the present invention.

FIG. 5A is a block diagram of the mapper 220 according to an exemplary embodiment of the present invention.

Referring to FIG. 5A, the mapper 220 checks the address of a soft metric value and then maps the soft metric value to an index value corresponding to the address of the soft metric value. If the soft metric value has n bits and the index value is expressed in m bits, a memory 221 of the mapper 220 has a 2n×m map table.

Figure 5B:
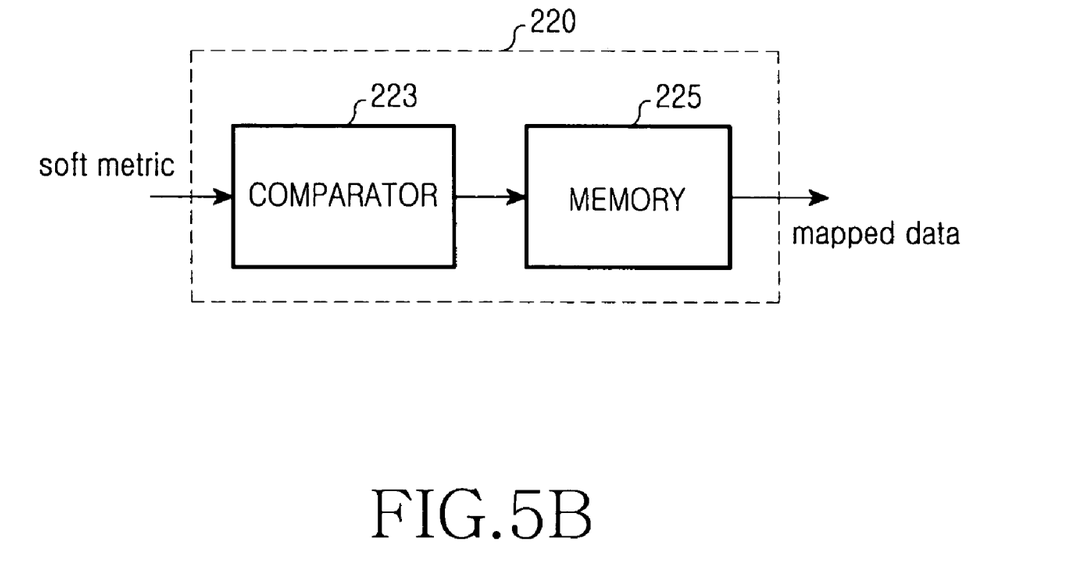
FIG. 5B is a block diagram of a mapper according to another exemplary embodiment of the present invention.

FIG. 5B is a block diagram of the mapper 220 according to another exemplary embodiment of the present invention.

Referring to FIG. 5B, the mapper 220 includes a comparator 223 and a memory 225. The comparator 223 determines a range within which an input soft metric value falls and generates an address according to the range. For example, if the soft metric value is level 6, it falls within a range from level 5 to level 10 and thus the comparator 223 generates an address for the range. The memory 225 outputs an index value corresponding to the address in the map table. Compared to the first exemplary embodiment of the mapper 220, the memory 225 has a 2m×m map table because the map table lists m-bit index values and m addresses rather than include all soft metric values.

The demapper 240 illustrated in FIG. 2 will be described with reference to FIG. 6. The configuration and operation of the exemplary demapper 240 applies commonly to the first and second exemplary embodiments.

Figure 6:
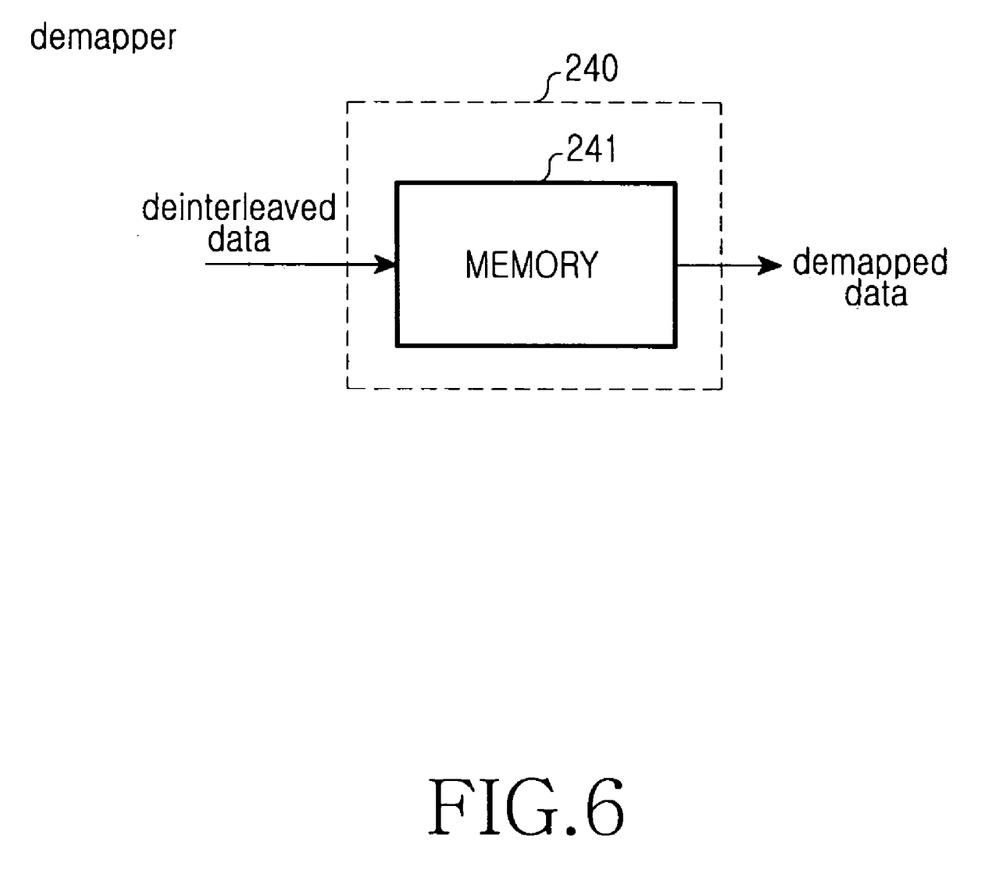
FIG. 6 is a block diagram of a demapper according to an exemplary embodiment of the present invention.

Referring to FIG. 6, the demapper 240 demaps a deinterleaved index value to a representative value. A map table for demapping is stored in a memory 241. The memory 241 is of a 2m×n size.

Figure 7:
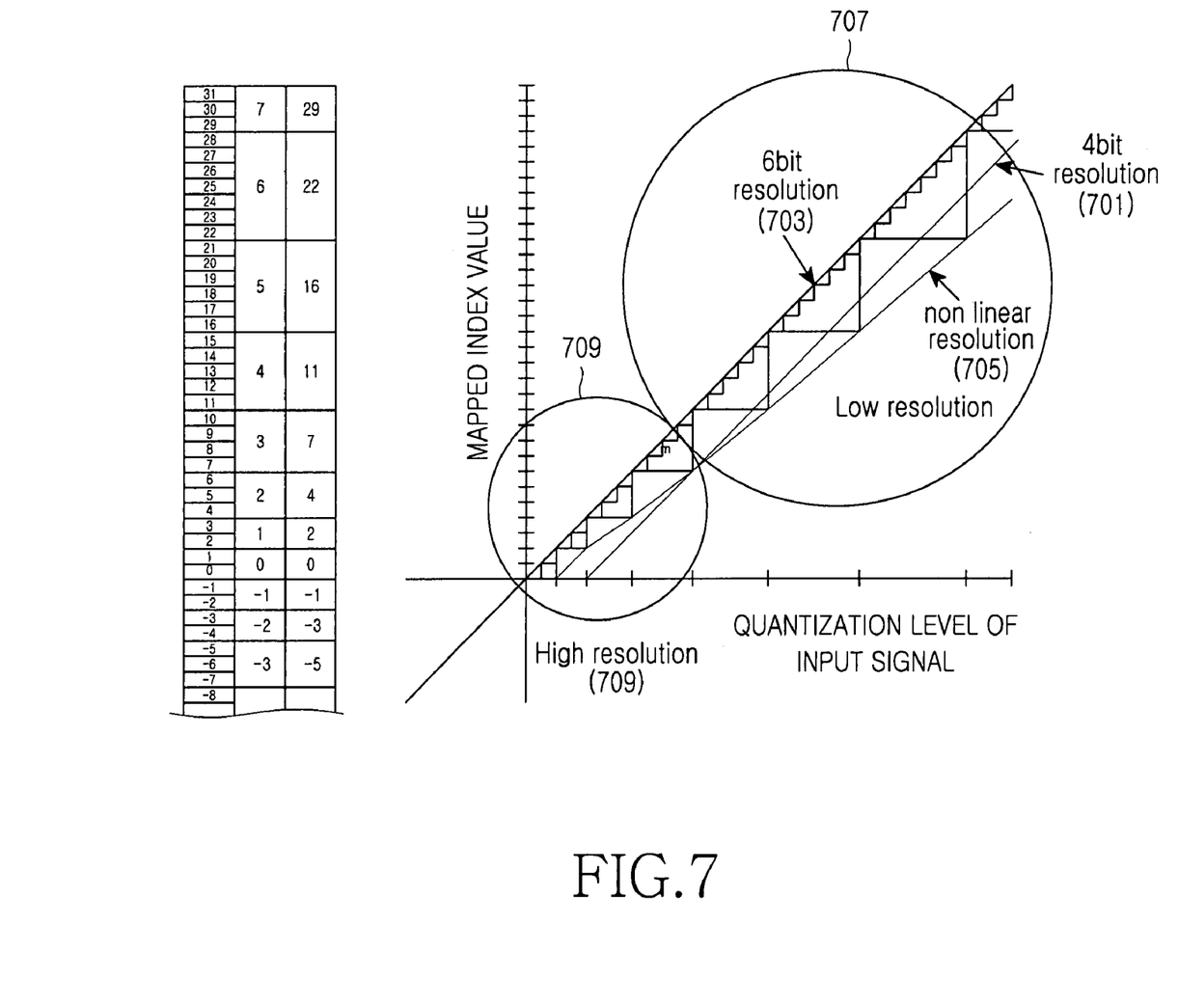
FIG. 7 is a graph illustrating non-linear mapping with different resolution levels according to an exemplary embodiment of the present invention.

FIG. 7 is a graph illustrating non-linear mapping with different resolution levels according to exemplary embodiments of the present invention. The x axis represents index values to which quantization levels are mapped by the mapper 220, and y axis represents the quantization levels of signals input to the mapper 220. The level intervals on the x axis represent 4-bit index values according to exemplary embodiments of the non-linear mapping of the present invention.

Referring to FIG. 7, a 6-bit resolution 703 means that the original 6 bits are mapped 6 bits, in other words no mapping is performed. A 4-bit resolution 701 means that input 6 bits are mapped to 4 bits. That is, data can be represented more accurately in 6 bits than in 4 bits. In accordance with the non-linear mapping 705 of the exemplary embodiments of the present invention, a higher resolution 709 is achieved closer to the origin, while a lower resolution 707 is given farther from the origin. In other words, quantization levels are mapped with the 6-bit resolution 703 as they are closer to the origin.

Figure 8:
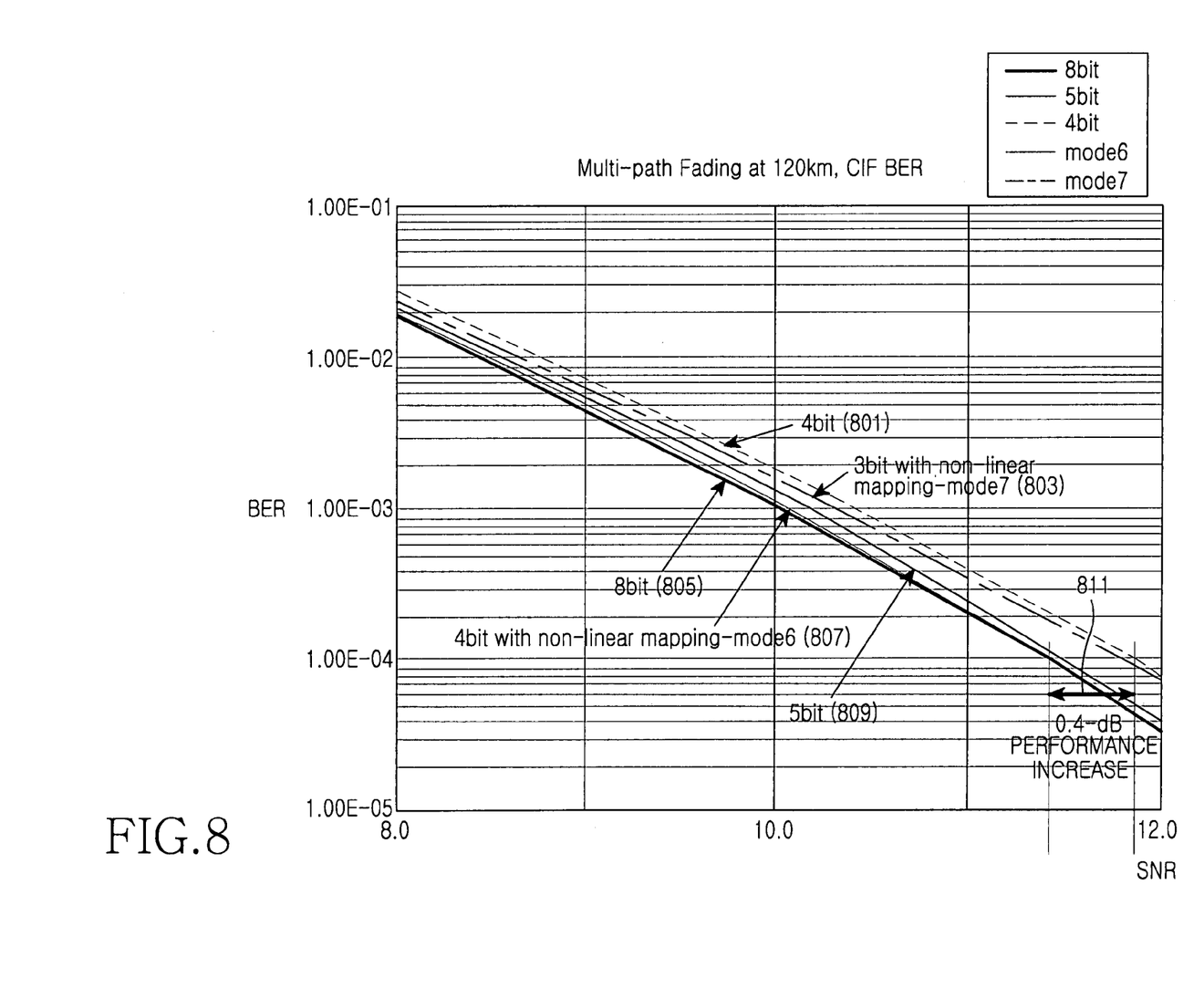
FIG. 8 is a graph illustrating the simulated results of the performance of the non-linear mapping according to an exemplary embodiment of the present invention.

FIG. 8 is a graph illustrating the simulated results of the performance of the non-linear mapping according to exemplary embodiments of the present invention. A simulation was performed under the conditions of a multipath fading environment, a velocity of 120 km/h, and a coding rate of 0.5. The x axis represents Signal-to-Noise-Ratio (SNR), and the y axis represents Bit Error Rate (BER).

Referring to FIG. 8, reference numerals 801, 805 and 809 denote performance curves using 4-bit linear quantization, 8-bit linear quantization, and 5-bit linear quantization, respectively. Reference numerals 803 and 807 denote performance curves using 3-bit non-linear quantization and 4-bit non-linear quantization, respectively.

Relatively left curves provide better performance. A comparison between curve 801 and curve 807 tells that the 4-bit non-linear mapping outperforms the 4-bit linear mapping by about 0.4 dB at a BER of 1.00 E-4. Also, the 3-bit non-linear mapping outperforms the 4-bit linear mapping. Consequently, a 4-bit decoder input brings an approximately 0.4 dB gain, with the same effects of a 6-bit decoder input, compared to the conventional technology. Therefore, the memory size can be reduced by ⅓. If the decoder input is 3 bits, the size of the deinterleaver before the decoder can be decreased by about ¼.

As described above, the exemplary non-linear mapping method of the present invention reduces memory complexity in an interleaver or in a receiver with a long memory depth, thereby reducing a chip size and power consumption. Also, since the exemplary non-linear mapper and demapper of the present invention is very low, overall performance can be improved due to the decrease of memory size.

While the invention has been shown and described with reference to certain exemplary embodiments thereof, it will be understood by those skilled in the art that various changes in form and details may be made therein without departing from the spirit and scope of the invention as defined by the appended claims and the full scope of equivalents thereof.

What is claimed is:

1. A broadcasting receiver, comprising:
    a demodulator for demodulating a received broadcasting signal, clipping a soft metric value corresponding to the demodulated signal to a certain number of bits, and outputting a first clipped soft metric value;
    a mapper for mapping the first clipped soft metric value to an index value with a resolution inversely proportional to a quantization level of the first clipped soft metric value;
    a deinterleaver for deinterleaving the index value;
    a demapper for demapping the deinterleaved index value to a second soft metric value determined from a range of soft metric values mapped to the index value; and
    a channel decoder for decoding the second soft metric value.

2. The broadcasting receiver of claim 1, wherein the bit number of the index value is fewer than the bit number of the first clipped soft metric value.

3. The broadcasting receiver of claim 1, wherein the mapper comprises a memory for storing a map table in which soft metric values are mapped to index values.

4. The broadcasting receiver of claim 1, wherein the mapper comprises:
    a comparator for checking a range of the first clipped soft metric value; and
    a memory for storing a map table having the index value mapped to the range.

5. The broadcasting receiver of claim 1, wherein the range increases with an increase in quantization level.

6. The broadcasting receiver of claim 1, wherein the second soft metric value is the lowest value in the range.

7. The broadcasting receiver of claim 1, wherein the channel decoder comprises a Viterbi decoder.

8. The broadcasting receiver of claim 1, wherein the first clipped soft metric value comprises 6 bits.

9. The broadcasting receiver of claim 1, wherein the index value comprises 4 bits.

10. A broadcasting receiving method, comprising:
    demodulating a received broadcasting signal;
    clipping a soft metric value corresponding to the demodulated signal to a number of bits;
    outputting a first clipped soft metric value;
    mapping the first clipped soft metric value to an index value with a resolution inversely proportional to a quantization level of the first clipped soft metric value;
    deinterleaving the index value;
    demapping the deinterleaved index value to a second soft metric value determined from a range of soft metric values mapped to the index value; and
    decoding the second soft metric value.

11. The broadcasting receiving method of claim 10, wherein the mapping of the first clipped soft metric value comprises mapping the first clipped soft metric value to an index value having fewer bits than the first clipped soft metric value.

12. The broadcasting receiving method of claim 10, wherein the mapping of the first clipped soft metric value comprises mapping the first clipped soft metric value directly to the index value.

13. The broadcasting receiving method of claim 10, wherein the mapping of the first clipped soft metric value comprises:
    checking a range of the first clipped soft metric values; and
    mapping the first clipped soft metric value to the index value referring to a map table having the index value mapped to the range.

14. The broadcasting receiving method of claim 10, wherein the range increases with an increase in a quantization level.

15. The broadcasting receiving method of claim 10, wherein the second soft metric value is the lowest value in the range.

16. The broadcasting receiving method of claim 10, the first clipped soft metric value comprises 6 bits.

17. The broadcasting receiving method of claim 10, wherein the index value comprises 4 bits.

* * * * *

UNITED STATES PATENT AND TRADEMARK OFFICE
CERTIFICATE OF CORRECTION

PATENT NO. : 7,656,973 B2 Page 1 of 1
APPLICATION NO. : 11/488645
DATED : February 2, 2010
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this

Twenty-eighth Day of December, 2010

David J. Kappos
*Director of the United States Patent and Trademark Office*